United States Patent
Prunier et al.

(10) Patent No.: US 12,413,586 B2
(45) Date of Patent: Sep. 9, 2025

(54) DECENTRALIZED AUTHORIZATION WITH ZERO-TRUST

(71) Applicant: Dell Products L.P., Round Rock, TX (US)

(72) Inventors: Dominique Prunier, Montreal (CA); Alan White, Glasgow (GB); Qi Jin, Sudbury, MA (US); Yi Fang, Sharon, MA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 356 days.

(21) Appl. No.: 18/327,303

(22) Filed: Jun. 1, 2023

(65) Prior Publication Data
US 2024/0406169 A1     Dec. 5, 2024

(51) Int. Cl.
H04L 29/06     (2006.01)
H04L 9/40     (2022.01)

(52) U.S. Cl.
CPC ...... H04L 63/0876 (2013.01); H04L 63/0807 (2013.01); H04L 63/20 (2013.01)

(58) Field of Classification Search
None
See application file for complete search history.

(56) References Cited

U.S. PATENT DOCUMENTS

| | | | | |
|---|---|---|---|---|
| 8,239,929 B2* | 8/2012 | Kwan | ...................... | H04L 63/08 713/168 |
| 10,348,767 B1* | 7/2019 | Lee | ...................... | H04L 63/1416 |
| 10,666,657 B1* | 5/2020 | Threlkeld | ............. | H04L 9/0643 |
| 10,673,862 B1* | 6/2020 | Threlkeld | ................ | G06F 21/62 |
| 10,715,514 B1* | 7/2020 | Threlkeld | ........... | H04L 63/0807 |
| 11,599,960 B2* | 3/2023 | Groth | ................... | G06F 21/6245 |
| 2010/0192212 A1* | 7/2010 | Raleigh | .............. | G06Q 30/0207 726/7 |
| 2011/0209196 A1* | 8/2011 | Kennedy | ................ | G06Q 30/02 726/1 |

(Continued)

OTHER PUBLICATIONS

Tang, Chunlin et al. Policy-Based Network Access and Behavior Control Management. 2020 IEEE 20th International Conference on Communication Technology (ICCT). https://ieeexplore.ieee.org/stamp/stamp.jsp?tp=&arnumber=9295916 (Year: 2020).*

Lee, Deok Gyu et al. Smart Environment Authentication: Multi-domain Authentication, Authorization, Security Policy for Pervasive Network. 2008 International Symposium on Ubiquitous Multimedia Computing. https://ieeexplore.ieee.org/stamp/stamp.jsp?tp=&arnumber=4656525 (Year: 2008).*

(Continued)

*Primary Examiner* — Jeremiah L Avery
(74) *Attorney, Agent, or Firm* — Amin, Turocy & Watson, LLP

(57) ABSTRACT

Architectures and techniques are described that can provide decentralized, zero-trust authorization according to variable fine-grained policies For example, an authorization server can receive an authorization request from a requesting device. The authorization request can comprise a reference address to a resource, in which case resource data can be fetched, or comprise a signed entity indicative of the resource. In either case, resource data used to evaluate a policy can be obtained and, if an associated policy evaluation is authorized, the authorization request can be validated and an associated token can be provided to the requesting device, which can then be transmitted along with an API call to a service through which a resource is provided.

20 Claims, 11 Drawing Sheets

(56) References Cited

U.S. PATENT DOCUMENTS

| | | | | |
|---|---|---|---|---|
| 2011/0214157 | A1* | 9/2011 | Korsunsky | H04L 63/1458 726/1 |
| 2012/0240185 | A1* | 9/2012 | Kapoor | H04L 41/0866 726/1 |
| 2014/0282586 | A1* | 9/2014 | Shear | G06F 16/245 718/104 |
| 2015/0143456 | A1* | 5/2015 | Raleigh | H04L 63/20 726/1 |
| 2015/0294377 | A1* | 10/2015 | Chow | G06Q 30/0263 705/347 |
| 2016/0034305 | A1* | 2/2016 | Shear | G06F 9/50 707/722 |
| 2016/0366183 | A1* | 12/2016 | Smith | H04L 63/06 |
| 2017/0078321 | A1* | 3/2017 | Maylor | H04L 63/08 |
| 2017/0180378 | A1* | 6/2017 | Tyler | H04L 63/1433 |
| 2019/0261203 | A1* | 8/2019 | Raleigh | H04L 12/1496 |
| 2022/0014512 | A1* | 1/2022 | Raleigh | H04L 63/20 |
| 2023/0040365 | A1* | 2/2023 | Raleigh | H04W 48/16 |
| 2025/0141926 | A1* | 5/2025 | Jain | H04L 63/105 |

OTHER PUBLICATIONS

Rosendo, Daniel et al. An autonomic and policy-based authorization framework for OpenFlow networks. 2017 13th International Conference on Network and Service Management (CNSM). https://ieeexplore.ieee.org/stamp/stamp.jsp?tp=&arnumber=8255990 (Year: 2017).*

Chen, Zhen et al. Application level network access control system based on TNC architecture for enterprise network. 2010 IEEE International Conference on Wireless Communications, Networking and Information Security. https://ieeexplore.ieee.org/stamp/stamp.jsp?tp=&arnumber=5541863 (Year: 2010).*

Bertocci, "From Idea to Standard: How the JWT Profile for OAuth 2.0 Access Tokens Became RFC9068," Nov. 4, 2021, https://auth0.com/blog/how-the-jwt-profile-for-oauth-20-access-tokens-became-rfc9068/.

Jones, et al., "OAuth 2.0 Token Exchange," Published: Jan. 2020, https://datatracker.ietf.org/doc/html/rfc8693.

* cited by examiner

DECENTRALIZED AUTHORIZATION WITH ZERO-TRUST

BACKGROUND

Zero-Trust (ZT) is a cyber security approach that focuses on users, assets, and resources. Conceptually, ZT has as central idea that trust or authorization is never granted implicitly, therefore a goal is to continuously verify network activity.

Authorization of network activity can be conceptually thought of as a process to verify and enforce specific policies of who, what, and where. For example, the network activity may be related to a particular device or user entity (e.g., who) attempting to perform a specific operation (e.g., what) on a particular resource (e.g., where). Current approaches to authorizing network activity in a ZT environment are directed toward centralization. This follows from the assumption that authorization requires direct knowledge of the various network activity as well as the data relied on to evaluate a given authorization policy. Thus, centralization of the data relied upon, at least in a way that is considered trustworthy in accordance with ZT, has been the common approach to date.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
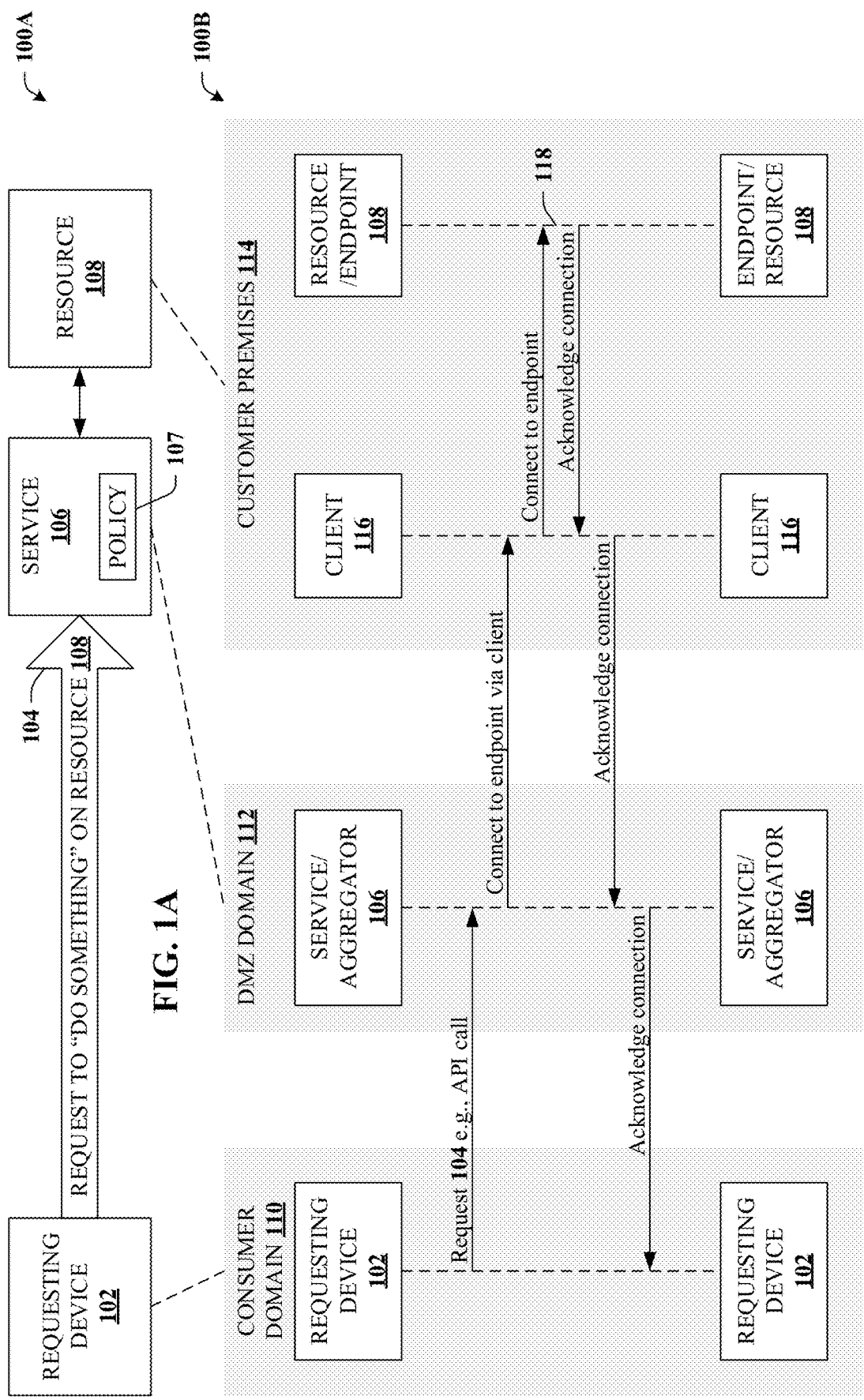
FIG. 1A depicts a schematic block diagram 100A illustrating an example use case scenario for an API call in accordance with certain embodiments of this disclosure.
FIG. 1B depicts an example call flow diagram 100B for the example use case in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In a world in which microservices are ubiquitous, there is a trend for application programming interfaces (APIs) that were part of a single monolithic application to be instead implemented as representational state transfer (REST) APIs that can be deployed across multiple services. Following this trend, previous trust models of the monolithic application, where everything running within the application was considered trusted, are evolving toward a more micro services-centric model in which authorization for specific service identities is determined individually, not based on being part of a given application.

With the emergence of ZT, authorization has matured into a more granular trust model in which merely being part of the same application is not enough to grant implicit authorization to a call to any API on any service that is part of the application. One example use case is illustrated in FIGS. 1A and 1B.

With reference now to FIGS. 1A and 1B, FIG. 1A depicts a schematic block diagram 100A illustrating an example use case scenario for an API call in accordance with certain embodiments of this disclosure. FIG. 1B depicts an example call flow diagram 100B for the example use case in accordance with certain embodiments of this disclosure.

In this example, requesting device 102 transmits request 104 to service 106. Requesting device 102 can be any suitable device that is communicating on behalf of some requesting entity. The requesting entity can be, e.g., a user, an application, or a service. Request 104 can be a request to do something with respect to a certain resource 108. In other words, request 104 can be a request to perform some operation on resource 108, like establish a connection with resource 108, which can be embodied as an API call. As illustrated by call flow diagram 100B, all or a portion of requesting device 102 can be within consumer domain 110 (e.g., the Internet).

With regard to service 106, as a non-limiting, but representative example, service 106 can be a cloud service that can concurrently provide, host, or aggregate services for many independent organizations. Thus, service 106 can be used to create a TCP connection to resource/endpoint 108 through client 116. As illustrated by call flow diagram 100B, all or a portion of service/aggregator 106 can be within demilitarized zone (DMZ) domain 112, which can operate as a secure perimeter network or gateway between consumer domain 110 and customer premises 114. In this example, customer premises 114 can include client 116 that interfaces with service/aggregator 106 and provides access to resource/endpoint 108.

Still referring to call flow diagram 100B, requesting device 102 can transmit request 104 (e.g., an API call) to service/aggregator 106. As one example, service/aggregator 106 can authorize requesting device 102 according to policy 107. In that case, service/aggregator 106 can request a connection via client 116, which can, in turn, be communicated to resource/endpoint 108 in order to establish connection 118. Acknowledgements can be transmitted in response, and thereafter, using connection 118, requesting device 102 can directly communicate with resource/endpoint 108, e.g., perform the API call and receive an associated API call response.

In the context of ZT, there are many aspects involved in implementing ZT architectures, but such typically involve two primary considerations. First, the notion of verifiable identities for API callers (e.g., requesting device 102), which can be a user, an application, or a service. Second, some more or less granular authorization polices (e.g., policy 107) describing which specific identities (e.g., who) can perform which specific operations (e.g., what) on which specific resources 108 (e.g., where).

This approach, however, has a significant shortcoming, particularly in view of decentralized approaches. Namely, this approach assumes that an associated authorization server (not shown, but see FIG. 2) or other authorization component or element has access to all the data relied upon to evaluate policy 107. For example, service/aggregator 106 generally performs policy enforcement and so service/aggregator 106 attempts to ensure that requesting device 102 is authorized to connect to resource/endpoint 108. However, service/aggregator 106 does not necessarily have knowledge of policy decisions of an associated customer such as the business rules that are used for policing resource/endpoint 108.

Moreover, service/aggregator 106 can be multi-tenant, and therefore can be expected to be usable by multiple business entities, some or all of which may have different policies and potentially even different notions of what constitutes a given resource/endpoint 108. Further, as service/aggregator 106 lives in DMZ domain 112, whereas the rest of the business may reside elsewhere, there may be limited to no communication back to decision-making services. Because of these and other issues, previous approaches have been directed to centralization in the context of ZT authorization, which is considered in more detail with reference to FIG. 2.

Figure 2:
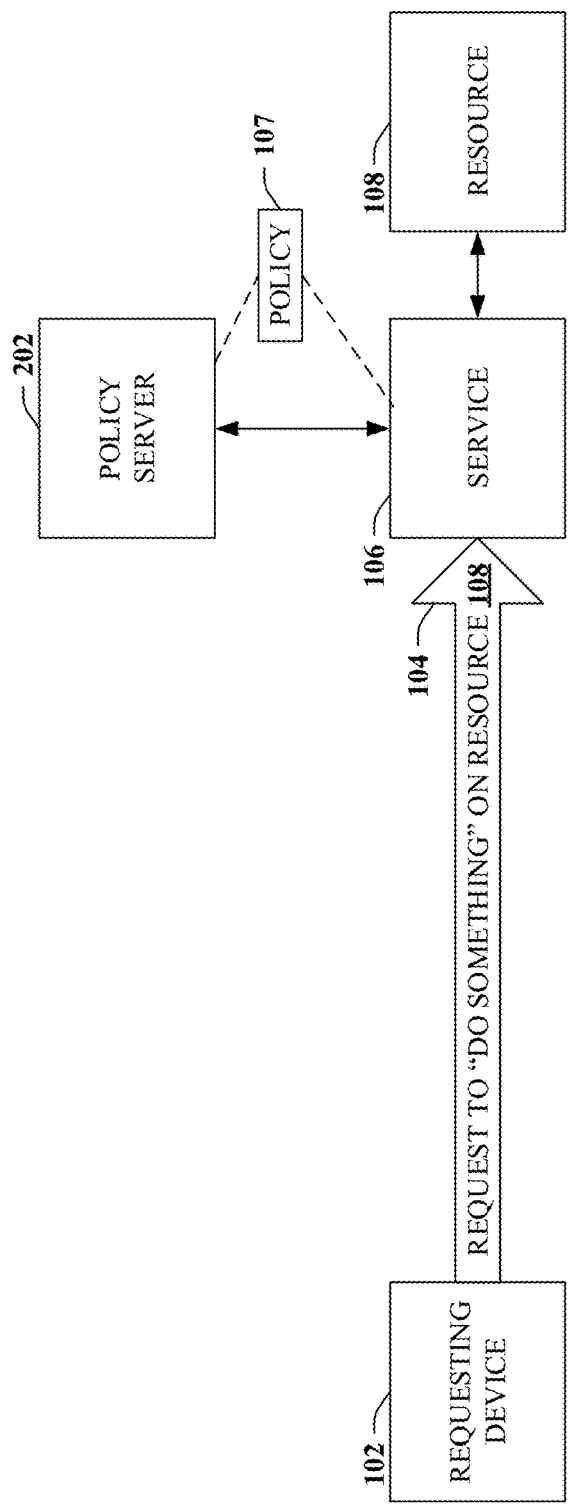
FIG. 2 depicts a schematic block diagram 200 illustrating various example centralized approaches to provide ZT authorization for network activity in accordance with certain embodiments of this disclosure.

Turning to FIG. 2, a schematic block diagram 200 is depicted illustrating various example centralized approaches to provide ZT authorization for network activity in accordance with certain embodiments of this disclosure. As a first example approach, service 106 can evaluate policy 107, as was illustrated in connection with FIG. 1.

Here, requesting device 102 transmits request 104 to service 106, where request 104 is evaluated according to policy 107. This centralized approach can be simplest to implement and in accord with what people typically think about when dealing with authorization. However, a shortcoming of this approach is that service 106 typically requires access to data that is utilized to evaluate policy 107, namely data indicative of who/what/where. In other words, service 106 needs to know about requesting device 102 (e.g., who) and associated actions taken (e.g., what) and resource data indicative of information on which to rely to evaluate potentially fine grained policies for resource 108 (e.g., where).

As previously mentioned, there are many scenarios in which a service 106 does not have access to either the fine grained policies or information regarding a particular resource 108. Therefore, this approach is generally only practical when there is an implicit tight coupling between service 106 and resource 108 such as when service 106 "owns" or otherwise controls or provides access to resource 108. In this approach, it is noted that service 106 evaluates policy 107 locally. Thus, unless service 106 downloads policy 107 from a centralized location, policies 107 can be spread across all such services 106, which can negatively impact maintenance, auditing, or other data operations. However, if policies 107 are intended to be retrieved from a centralized location, then such an implementation can limit the ability to manage fine grained policies, which can grow quite large and/or become overly complex.

As a second example approach, service 106 can send the necessary data to a centralized policy server 202 or associated authorization service. As one example, policy server 202 can be implemented as an open policy agent (OPA). For instance, service 106 can receive request 104 from requesting device 102, and forward the information utilized (e.g., who/what/where) to policy server 202. One advantage of this approach is that it allows for centralized policy management. However, this approach suffers from some of the disadvantages of the first approach, e.g., it inherently requires a tight coupling between service 106 and resource 108, meaning the approach is only practical when service 106 "owns" or otherwise controls or provides access to resource 108. Furthermore, unless service 106 is a trusted source for the data it provides to policy server 202, such would violate ZT principles. While being a trusted source for information that service 106 "own" may not be an issue in the context of centralization, on the other hand such inherently operates to limit decentralized use cases or non-data related use cases.

A third example approach can be to implement a centralized policy server 202 that can model the appropriate entities and relationships. In this example, requesting device 102 can transmit request 104 to policy server 202. An advantage of this approach is that it provides a single, trusted place for policy decisions. However, one disadvantage is that this approach potentially duplicates information that is already available at other trusted sources. Apart from potentially duplicating already available information, this approach might also overlap business data and can therefore become inconsistent.

As another potential disadvantage, because of the centralized nature of this approach, it tightly couples service 106 with one set of policies (e.g., policy 107) and/or authorization model. Such can operate to limit multi-tenant use cases. Similarly, this approach assumes service 106 has connectivity to policy server 202, which has been demonstrated to be a shortcoming in some scenarios.

In contrast to centralized approaches, such as the examples detailed above, the disclosed subject matter is directed to a decentralized, potentially fully decentralized, fine-grained authorization system that can rely solely on ZT principles to make enforcement decisions.

Example Systems

Figure 3:
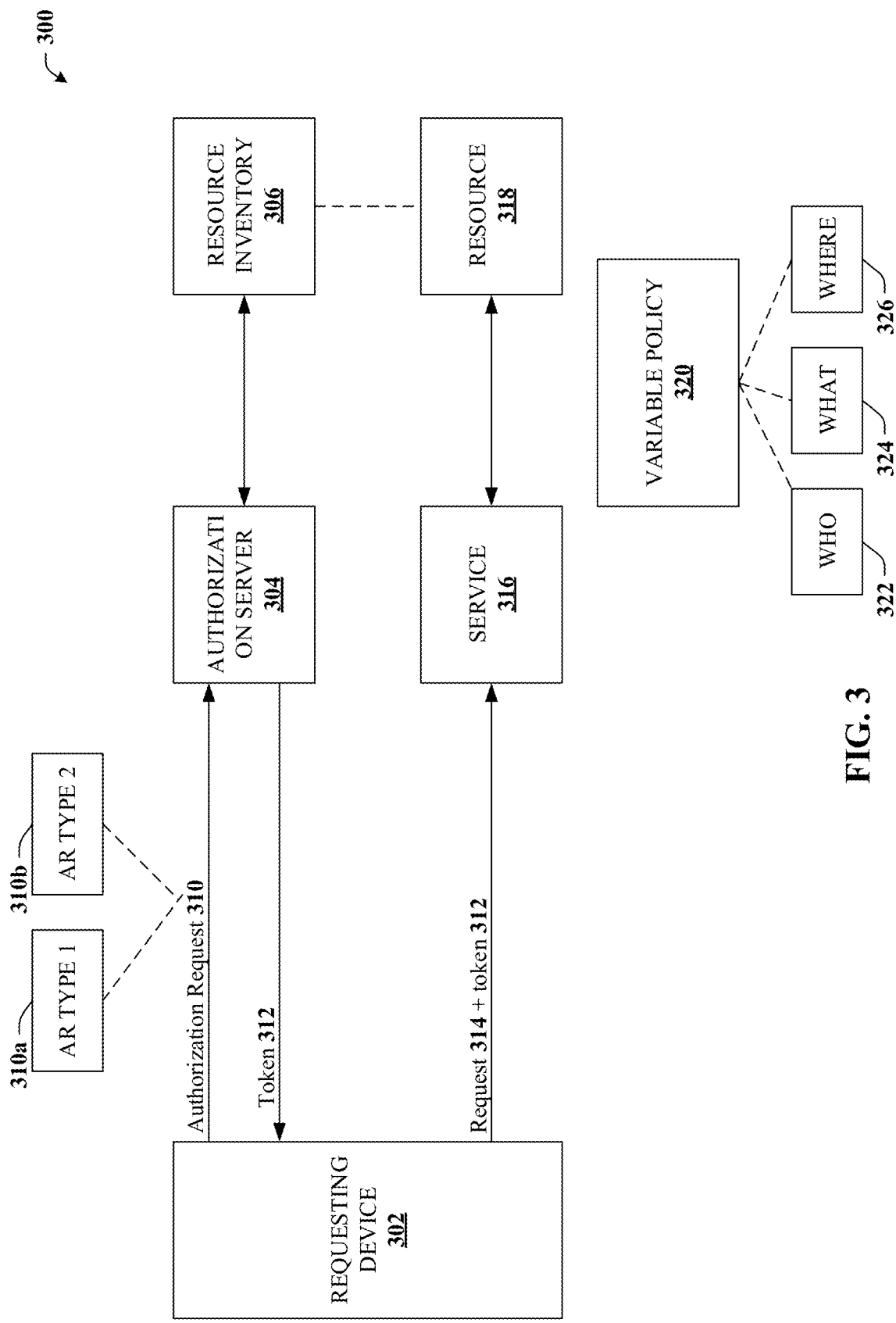
FIG. 3 depicts a schematic block diagram 300 illustrating an example authorization server 304 that can provide decentralized, zero-trust authorization according to variable fine-grained policies in accordance with certain embodiments of this disclosure.

Referring now to FIG. 3, a schematic block diagram 300 is depicted illustrating an example system 300 that can provide decentralized, zero-trust authorization according to variable fine-grained policies in accordance with certain embodiments of this disclosure. For example, apart from communication with requesting device 302, authorization server 304 does not rely on connectivity with any other entity and, in particular, does not rely on service 316 "owning" or otherwise controlling or providing access to resource 318. Thus, in some embodiments, authorization can take place in a decentralized manner. In some embodiments, the term 'decentralized' can mean that that two entities are not tightly coupled and/or are decoupled from one another, e.g., such that local operations do not directly rely upon or use as input information or output from a decoupled entity.

To these and other related ends, authorization server 304 can in some embodiments comprise or be communicatively coupled to resource inventory 306. Resource inventory 306 can be a device or store that, inter alia, is a trusted source of resource data or other information about resource 318. In some embodiments, authorization server 304 can be implemented as a token exchange service. Generally, a token exchange service can be a device or other element configured to, inter alia, generate a first token in response to a second token being validated.

As illustrated, requesting device 302 can transmit authorization request 310, which can be received by authorization server 304. Authorization request 310 can be indicative of a request to authorize that requesting device 302 or an associated entity (e.g., user, application, service, . . . ) is permitted or trusted to perform, via service 316, some operation on resource 318.

It is observed that authorization decisions can be based on a policy, which is denoted here as variable policy 320. Variable policy 320 can be as fine-grained as needed and therefore can be variable in the granular sense. Variable policy 320 can also vary across customers, clients, or other suitable entities in an entity-tailoring sense (e.g., for multi-tenant services 316). In order to evaluate any given variable policy 320, authorization service 304 can compare suitable data such as who 322, what 324, and where 326. In other words, an evaluation of whether variable policy 320 permits requesting device 302 (e.g., who 322) to perform an operation (e.g., what 324) on resource 318 (e.g., where 326).

Hence, in some embodiments, authorization request 310 can include an identifier relating to requesting device 302 or the associated entity such as a requesting device identifier, a requesting device application identifier, a requesting device service identifier or the like. The identity can be made "trustable" such that information for policy evaluation (e.g., who 322, what 324, and where 326) can be safely used. For example, information that is signed by a trusted authority. In this example, the associated identifier can represent who 322.

Authorization request 310 can include any other suitable information or metadata, including information that can be utilized by authorization server 304 to determine a type of authorization request 310. As representative examples, authorization request 310 can be of a first type, authorization request (AR) 310a, or of a second type, authorization request 310b, which are further detailed in connection with FIGS. 4-7.

In either case (e.g., either AR 310a or AR 310b), provided that an associated authorization evaluation of who 322, what 324, and where 326 is successful, authorization server 304 can provide token 312 to requesting device 302. Requesting device 302 can then add token 312 to a request 314 to service 316. Request 314 can be substantially similar to request 104 detailed in previous examples, but can further comprise token 312.

It is observed that in a ZT environment, service 316 typically requires the result of some trusted evaluation of variable policy 320 to authorize a requesting device 302 (e.g., who 322) to perform an operation (e.g., what 324) on a particular resource 318 (e.g., where 326). However, instead of service 316 evaluating the variable policy 320 directly as is done in certain other approaches discussed above, service 316 can instead expect requesting device 302 to provide a signed assertion that it has been authorized to perform the operation on the indicated resource 318. Here, this signed assertion is represented as token 312.

As one non-limiting example, token 312 can take the form of a signed JavaScript Object Notation (JSON) web token (JWT). In that case, an example implementation can be as follows:

```
{
"iss": "https://issuer.service.com/",
...
"sub": "client1234", / / who
"scope": "operation", / / what
"resource":
"https://some.data.service/resource/1234" / / where
}
```

Upon receiving request 314, which includes token 312, service 316 can then perform traditional JWT validations (or other validation techniques depending on the form taken by token 312) such as validating the signature, audience, expiration, and so forth. Service 316 can then validate that said token validation matches request 314 and that it is sourced from a trusted authorization authority (e.g., the issuer along with the associated signature). It is observed that service 316 can potentially be arbitrarily granular in determining what is considered a trusted authorization authority.

Thus, as depicted, prior to the actual call to service 316, requesting device 302 can communicate with authorization server 304 to obtain suitable authorization (e.g., token 312) from a suitably trusted authority (e.g., authorization server 304). As noted, such can be done via authorization request 310 to request token 312 Hence, as noted, authorization request 310 can indicate the appropriate requesting identifier (e.g., who 322), which is often already available in the form of a JWT, as well as the operation (e.g., what 324) and the resource 318 (e.g., where 326).

In terms of implementation, authorization server 304 can leverage a standard open authorization (OAuth) token exchange that is sufficiently modified such that the "resource" parameter according to OAuth specifications is suitably extended. As a result of this extension, requesting device 302 can have multiple ways to provide the resource to authorization server 304, which are illustrated by the different types of authorization request 310, namely AR 310a and AR 310b.

Figure 4:
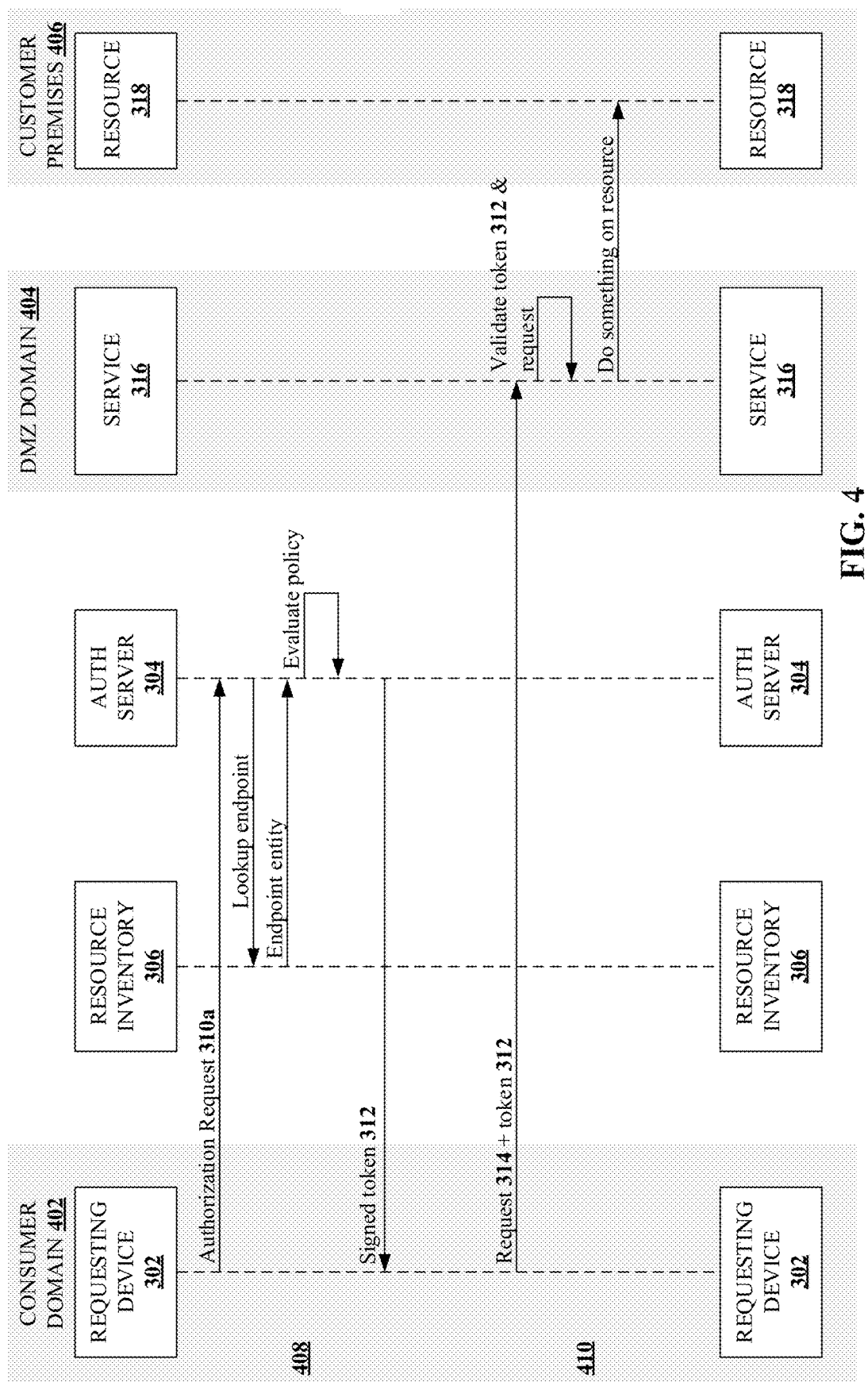
FIG. 4 illustrates a simplified call flow diagram 400 depicting an example call flow for a first type of authorization request 310a in accordance with certain embodiments of this disclosure.

Turning now to FIG. 4, a simplified call flow diagram 400 is depicted illustrating an example call flow for a first type of authorization request 310a in accordance with certain embodiments of this disclosure. In this example, requesting device 302 lives in consumer domain 402, which can be substantially similar to consumer domain 110 of FIG. 1B. In some embodiments, it can be assumed that requesting device 302 has previously acquired an access token that consists of a signed JWT (or other token) with certain metadata (e.g., who 322) that can be used to evaluate authorization policies.

Reference numeral 408 is intended to encompass call flows between requesting device 302 and authorization server 304. Initially, requesting device 302 transmits request 310a. In accordance with the disclosed subject matter, resources 318 can be addressable via some reference address, e.g., in a manner similar to RFC8693 that requires representation via uniform resource identifiers (URIs). As such, in authorization request 310a can comprise some suitable reference address to resource 318, which can take the form of a uniform resource locator (URL) as shown below. One example of a relevant portion of authorization request 310a can be as follows:

```
POST /as/token.oauth2 HTTP/1.1
Host: as.example.com
Authorization: Basic
cnMwODpsb25nLXNlY3VyZS1yYW5kb20tc2VjcmV0
Content-Type: application/x-www-form-urlencoded
grant_type=urn:ietf:params:oauth:grant-type:token-
exchange
&resource=https://some.data.service/resource/1234
&scope=operation
&subject_token=accVkjcJyb4BWCxGsndESCJQbdFMogUC5PbRD
qceLTC
&subject_token_type=urn:ietf:params:oauth:token-
type:access_token
```

It is understood that use of a resolvable hypertext transfer protocol secure (HTTPS) URL in the above is only one example of an associated reference address. Other examples are contemplated such as an opaque URI such as, for instance: com.company.type:1234, which authorization server 304 can resolve as well.

Hence, AR 310a effectively requests authorization to connect to a given resource 318. A resource identifier can contain a unique identifier, certain metadata that can be used to evaluate authorization policies, as well as any other suitable information (e.g., criteria for client selection such as client 116, or the like).

In response, authorization server 304 can in some embodiments validate the above-mentioned access token and/or fetch resource 318 via the reference address provided, or a subset of resource 318 that can be utilized to evaluate policies such as a manifest for resource 318. In some embodiments, by leveraging transport level security (TLS), authorization server 304 can make a decision on whether resource 318 originates from a trusted source during the fetching process. If authorized, then authorization server 304 can then provide signed token 312 to requesting device 302.

Reference numeral 410 is intended to encompass relevant communication between consumer domain 402, DMZ domain 404 (which can be substantially similar to DMZ domain 112), and customer premises 406 (which can be substantially similar to customer premises 114). Requesting device 302 can transmit request 314 along with token 312 and in some embodiments the access token. Service 316 can validate all potential tokens and also validate that request 314 is allowed by token 312. If authorized, a connection to resource 318 can be requested (e.g., similar to connection 118). An acknowledgement can be sent to requesting device 302 and direct communication can commence via the connection as detailed with reference to FIG. 1.

Figure 5:
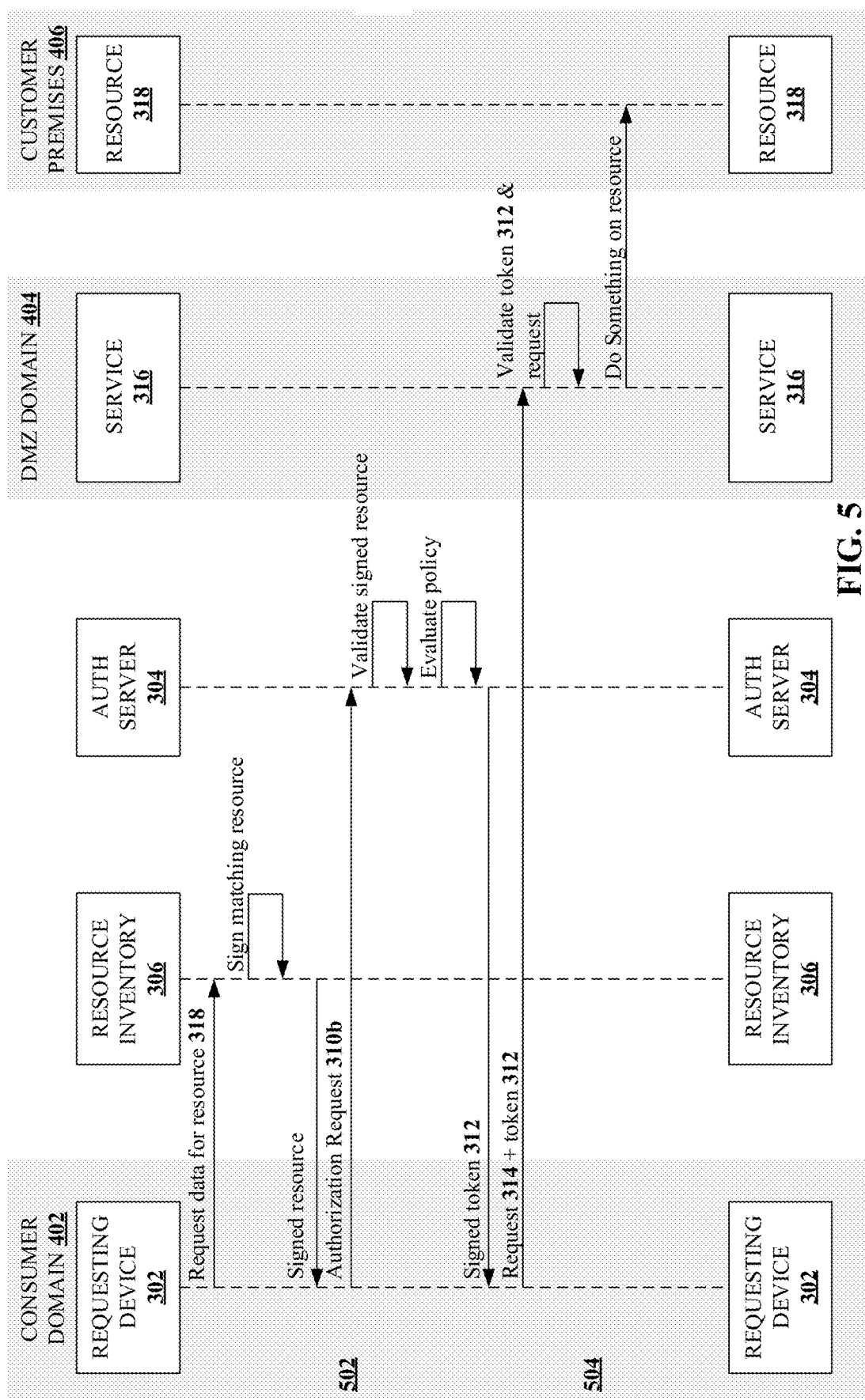
FIG. 5 is a simplified call flow diagram 500 illustrating an example call flow for a second type of authorization request 310b in accordance with certain embodiments of this disclosure.

Turning now to FIG. 5, a simplified call flow diagram 500 is depicted illustrating an example call flow for a second type of authorization request 310b in accordance with certain embodiments of this disclosure. Recall authorization request 310a can be defined or identified based on the existence of a reference address. On the other hand authorization request 310b can be defined or identified by cases without said reference address. Instead, authorization request 310b can comprise signed resource. In some embodiments, it can be assumed that requesting device 302 has previously acquired an access token. The signed resource and/or the access token can be represented by a signed JWT (or other token) with certain metadata that can be used to evaluate authorization policies Reference numeral 502 is intended to encompass call flows between requesting device 302 and authorization server 304, whereas reference numeral 504 is intended to encompass call flows between consumer domain 402, DMZ domain 404, and/or customer premises 406. Initially, requesting device 302 transmits a request for data about resource 318. Again, a resource identifier can contain a unique identifier, certain metadata that can be used to evaluate authorization policies, as well as any other suitable information (e.g., criteria for client selection such as client 116, or the like). Resource inventory device 306 can validate the access token and lookup resource 318 based on the provided criteria.

In response, resource inventory 304 can then provide a signed resource to requesting device 302. Requesting device can then transmit authorization request 310b, which can comprise the signed resource. In other words, instead of providing a reference address as is done in AR 310a, AR 310b can comprise resource 318 (or a suitable portion such as a manifest), which can mitigate the need for authorization server 304 to fetch the resource 318, further decoupling authorization server 304 from resource providers. In this second approach, the resource is signed so that authorization server 304 has the information relied upon to make a similar determination as the first approach, namely whether it originates from a trusted source. Again, such can be achieved by representing the resource (or the manifest) as a signed JWT encoded as a data URI of the token exchange resource parameter. A non-limiting example is as follows:

```
POST /as/token.oauth2 HTTP/1.1
Host: as.example.com
Authorization: Basic
cnMwODpsb25nLXNlY3VyZS1yYW5kb20tc2VjcmV0
Content-Type: application/x-www-form-urlencoded
grant_type=urn:ietf:params:oauth:grant-type:token-
exchange
&resource=data:application/jwt, eyJhbGciOiJIUzI1NiIsI
nR5cCI6IkpXVCJ9.
eyJpc3MiOiJodHRwczovL3NvbWUuZGF0YS5zZXJ2aWNlLyIsInN1
YiI6InJlc291cmNlLzEyMzQiLCJpYXQiOjM5NTYxMTIwMCwiZXhw
I
jozOTU2OTc2MDAsInNvbWUiOiJtZXRhZGF0YSIsImFuZCI6InByb
3BlcnRpZXMifQ.
YSZlWErp89mgVbglsE66WUlCrafOV118xLyAb8giSso
&scope=operation
&subject_token=accVkjcJyb4BWCxGsndESCJQbdFMogUC5PbRD
qceLTC
&subject_token_type=urn:ietf:params:oauth:token-
type:access_token
```

It is appreciated that in this second approach, it is assumed that the client has previously fetched the resource (or manifest) from a source that offers the ability to sign responses. It can be envisioned that this technique could represent a natural extension of a standard REST API, but with the addition of a signed=true parameter that can be configured to return resources as signed entities or using HTTP content negotiation but with the addition of Accept: application/jwt request header. As examples:

```
GET /resource/1234?signed=true HTTP/1.1
Host: some.data.service
Authorization: Bearer . . .
HTTP/1.1 200 OK
Content-type: application/jwt
eyJhbGciOiJIUzI1NiIsInR5cCI6IkpXVCJ9.
eyJpc3MiOiJodHRwczovL3NvbWUuZGF0YS5zZXJ2aWNlLyIsInN1YiI6I
nJlc291cmNlLzEyMzQiLCJpYXQiOjM5NTYxMTIwMCwiZXhwIjozOTU2
OTc2MDAsInNvbWUiOiJtZXRhZGF0YSIsImFuZCI6InByb3BlcnRpZXMif
Q.YSZlWErp89mgVbglsE66WUlCrafOV118xLyAb8giSso
```

Upon validation of AR 310*b*, by authorization server 304 (e.g., validating the signed resource and/or an access token, and evaluating variable policy 320), signed token 312 can be provided to requesting device 302.

Requesting device 302 can transmit request 314 along with token 312 and in some embodiments the access token. Service 316 can validate all potential tokens and also validate that request 314 is allowed by token 312. If authorized, a connection to resource 318 can be requested (e.g., similar to connection 118). An acknowledgement can be sent to requesting device 302 and further communication can commence via the connection as detailed with reference to FIG. 1.

In accordance with the techniques disclosed herein, it can be observed that, as a significant advantage, the disclosed subject matter can operate to completely decouple fine grained policy decisions from policy enforcement. A given service (e.g., service 316) does not rely on knowledge of how a given policy (e.g., variable policy 320) was made or who made the policy decision. Rather, the service only needs to enforce the policy. To do so, the service can simply be provided a list of trusted authorization servers 304. Furthermore, using delegated trust (e.g., certificates or the like), various interactions can be made zero-touch as well. That is, a service can simply trust as an authorization service, which can be the result of trusting some well-known root anchors and would not necessarily need to be updated when new trusted authorization servers are added or removed.

As another advantage, because service 316 does not have to communicate directly with authorization server 304, it can be hosted in regions that may not even have connectivity back to them (e.g., a DMZ, an edge, or the like). For similar reasons, such can also mean that authorization can be offloaded to proxies, sidecars, or other suitable entities, such very little knowledge is utilized to verify various tokens. As one example, a create, read, update, and delete (CRUD) operation applied to a given resource (e.g., resource 318) can be authorized by simply validating that the token matches the request URI and HTTP method.

As still another advantage, the disclosed techniques can operate to further decouple policy decisions from the data that is leveraged to give authorization. For instance, similar to service 316, authorization server 304 need only be provided trusted resource owners or trust anchors. For example, authorization server 304 does not require knowledge of any resource 318 in advance, as resource 318 can be fetched (e.g., see FIG. 4 relating to AR 310*a*) or provided by the requesting device 302 (e.g., see FIG. 5 relating to AR 310*b*). In other words, even without the ability to fetch a given resource 318, authorization server 304 can still ensure that resource 318 originates from a trusted source.

Yet another advantage of the disclosed techniques can relate to the various signature operations. Resource signatures can ensure that fetched resources cannot be tampered with, which can enable optimizations such as fetching a given resource 318 only once for multiple purposes, including authorization.

Another advantage of the disclosed techniques is that authorization server 304 is not tied to a particular data source or sources. Rather, relying on delegated trust (e.g., based on certificates or the like) can make it very easy to add additional trusted data source without altering configurations. Certain configurations of authorization server 304 can be with respect to trust anchors and policies in certain embodiments.

It can be observed that in some embodiments, implementation of authorization server 304 can share certain similarities to OAuth, however, numerous distinctions can be noted. In some cases, the disclosed techniques can operate by modifying or extending certain OAuth constructs in various ways for some implementations or embodiments.

For example, even though the disclosed techniques may rely on OAuth constructs as an implementation suggestion (e.g., JWT, token exchange), certain other constructs or techniques do not exist in OAuth specifications. In many embodiments, however, OAuth can be used as a framework that is extended where necessary and the disclosed techniques are not limited to OAuth constructs. Rather, the disclosed techniques might instead be implemented in many other ways such as a specific authorization service having its own APIs.

Fine grained authorization is considered an OAuth antipattern, which is one reason why the disclosed techniques are built on top of OAuth in several example illustrations, but that do not use OAuth directly (e.g. this isn't related to traditional OAuth flows, for which the various concerns in literature would be applicable).

Furthermore, the disclosed techniques can be much more decentralized and decoupled that any OAuth standards currently allow. Not only do the disclosed techniques not mandate communication between a service enforcing policy and the decision maker, it even decouples the decision maker from the retrieval of the data required to evaluate policies in several representative embodiments.

Figure 6:
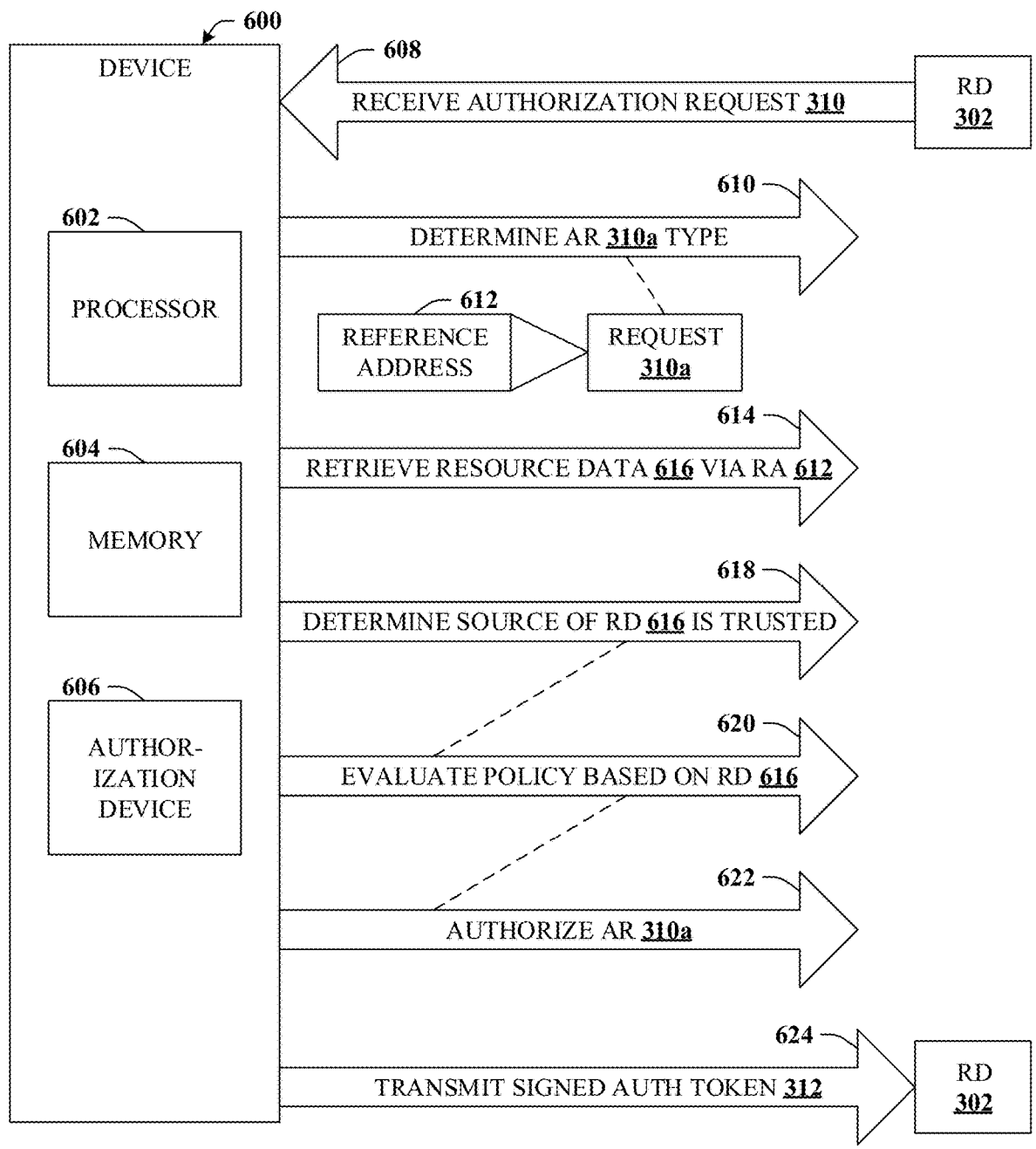
FIG. 6 depicts a schematic block diagram illustrating an example device 600 that can provide decentralized, zero-trust authorization according to variable fine-grained policies based on a first type of AR 310a in accordance with certain embodiments of this disclosure.

Referring now to FIG. 6, a schematic block diagram is depicted illustrating an example device 600 that can provide decentralized, zero-trust authorization according to variable fine-grained policies based on a first type of AR 310*a* in accordance with certain embodiments of this disclosure. In some embodiments, device 600 can be, or can be included in, an authorization server such as authorization server 304. Device 600 can comprise a processor 602 that, potentially along with authorization device 606, can be specifically configured to perform functions associated with decentralized ZT authorization. Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or authorization device 606. Along with these special-purpose instructions, processor 602 and/or authorization device 606 can be a special-purpose device. Further examples of the memory 604 and processor 602 can be found with reference to FIG. 11. It is to be appreciated that device 600 or computer 1102 can represent a server device or a client device of a network or network services platform and can be used in connection with implementing one or more of the systems, devices, or components shown and described in connection with FIG. 6 and other figures disclosed herein.

In some embodiments, device 600 can be embodied as authorization server 304, which, as detailed in FIG. 3, can operate as a token exchange service. In some embodiments, device 600 can comprise or be communicatively coupled to a resource inventory element such as resource inventory device 306, as detailed in connection with FIG. 3.

At reference numeral 608, device 600 can receive authorization request 310 from requesting device 302. Authorization request 310 can be a request to authorize requesting device 302 to perform, via a service (e.g., service 316) an operation on a resource (e.g., resource 318). Authorization request 310 can be in compliance with ZT and based on decentralized enforcement of a variable policy (e.g., variable policy 320).

At reference numeral 610, device 600 can determine a type authorization request 310. In this example, authorization request 310 is determined to be of a first type denoted authorization request 310a, as introduced and previously discussed at FIGS. 3 and 4. In that regard, device 600 can determine that authorization request 310 is of the first type, authorization request 310a, based on a determination that authorization request 310 comprises reference address 612. Reference address 612 can be indicative of a network address of the resource (e.g., resource 318). As with the example introduced in connection with FIG. 4, reference address 612 can be a URI, a URL, or another suitable type of address information.

At reference numeral 614, device 600 can retrieve resource data 616 via reference address 612. In some embodiment, resource data 616 can comprise the resource. In some embodiments, resource data 616 can comprise a manifest of the resource, or otherwise be indicative of certain information that is relied on to evaluate the variable policy. As a representative example, such can be or can relate to relevant information about who 322, what 324, and where 326, as discussed in connection with variable policy 320 of FIG. 3.

At reference numeral 618, device 600 can determine that a source of reference data 616 is trusted and, if so, at reference numeral 620, device 600 can evaluate the policy for authorization request 310a based on resource data 616. If the policy evaluation is not successful, then authorization request 310a can be rejected or denied.

On the other hand, assuming the policy evaluation is successful, at reference numeral 622, device 600 can authorize authorization request 310a and, at reference numeral 624, device 600 can transmit an associated signed authorization token (e.g., token 312) to requesting device 302. Requesting device 302 can then, for example, transmit an API call request to an appropriate service (e.g., service 316) that comprises the signed authorization token, as discussed previously in connection with FIGS. 3 and 4, noting that service 316 in that case does not need to perform any authorization, but rather need only validate signed authorization token 312 and verify it matches the request.

Figure 7:
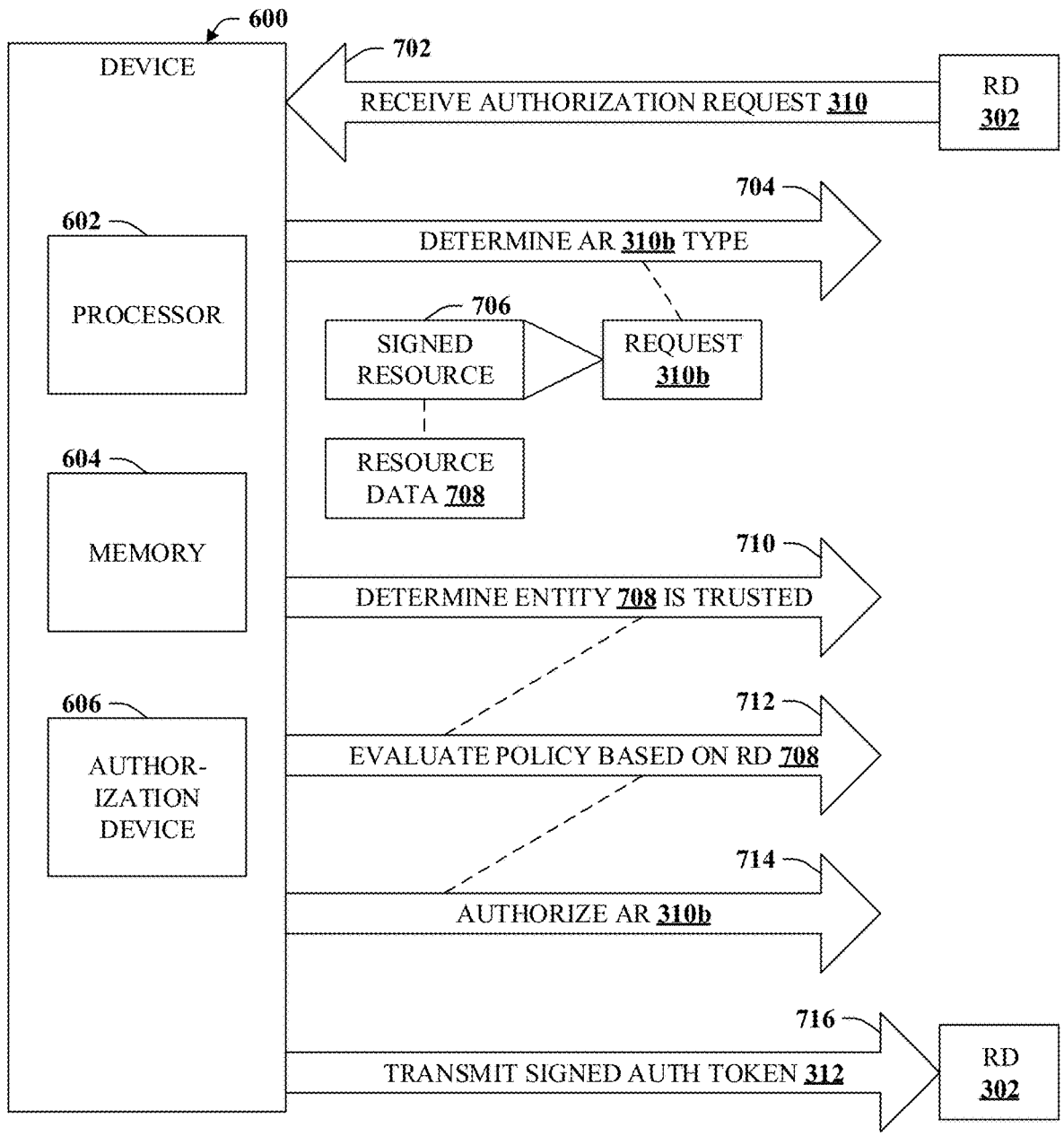
FIG. 7 depicts a schematic block diagram illustrating example device 600 that can provide decentralized, zero-trust authorization according to variable fine-grained policies based on a second type of AR 310b in accordance with certain embodiments of this disclosure.

Referring now to FIG. 7, a schematic block diagram is depicted illustrating example device 600 that can provide decentralized, zero-trust authorization according to variable fine-grained policies based on a second type of AR 310b in accordance with certain embodiments of this disclosure.

At reference numeral 702, device 600 can receive authorization request 310 from requesting device 302. Authorization request 310 can be a request to authorize requesting device 302 to perform, via a service (e.g., service 316) an operation on a resource (e.g., resource 318). Authorization request 310 can be in compliance with ZT and based on decentralized enforcement of a variable policy (e.g., variable policy 320).

At reference numeral 704, device 600 can determine a type authorization request 310. In this example, authorization request 310 is determined to be of a second type denoted authorization request 310b, as introduced and previously discussed at FIGS. 3 and 5. In that regard, device 600 can determine that authorization request 310 is of the second type, authorization request 310b, based on a determination that authorization request 310 comprises signed resource 706 (e.g., as opposed to reference address 612 discussed in connection with authorization request 310a of FIG. 6). Signed resource 706 can be signed by entity 708. In some embodiments, signed resource can be a JWT encoded as data URI by a token exchange resource parameter, as discussed with reference to FIG. 5.

At reference numeral 710, device 600 can determine whether entity 708 is trusted and/or whether signed resource 706 is from a trusted source. If so, at reference numeral 712, device 600 can perform a policy evaluation based on resource data 708. If the policy evaluation is not successful, then authorization request 310a can be rejected or denied.

Assuming the evaluation of the policy is positive, at reference numeral 714, device 600 can authorize authorization request 310b and, at reference numeral 716, device 600 can transmit an associated signed authorization token (e.g., token 312) to requesting device 302. Requesting device 302 can then, for example, transmit an API call request to an appropriate service (e.g., service 316) that comprises the signed authorization token, as discussed previously in connection with FIGS. 3 and 5, noting that service 316 in that case does not need to perform any authorization, but rather need only validate signed authorization token 312 and verify it matches the request.

Example Methods

Figure 8:
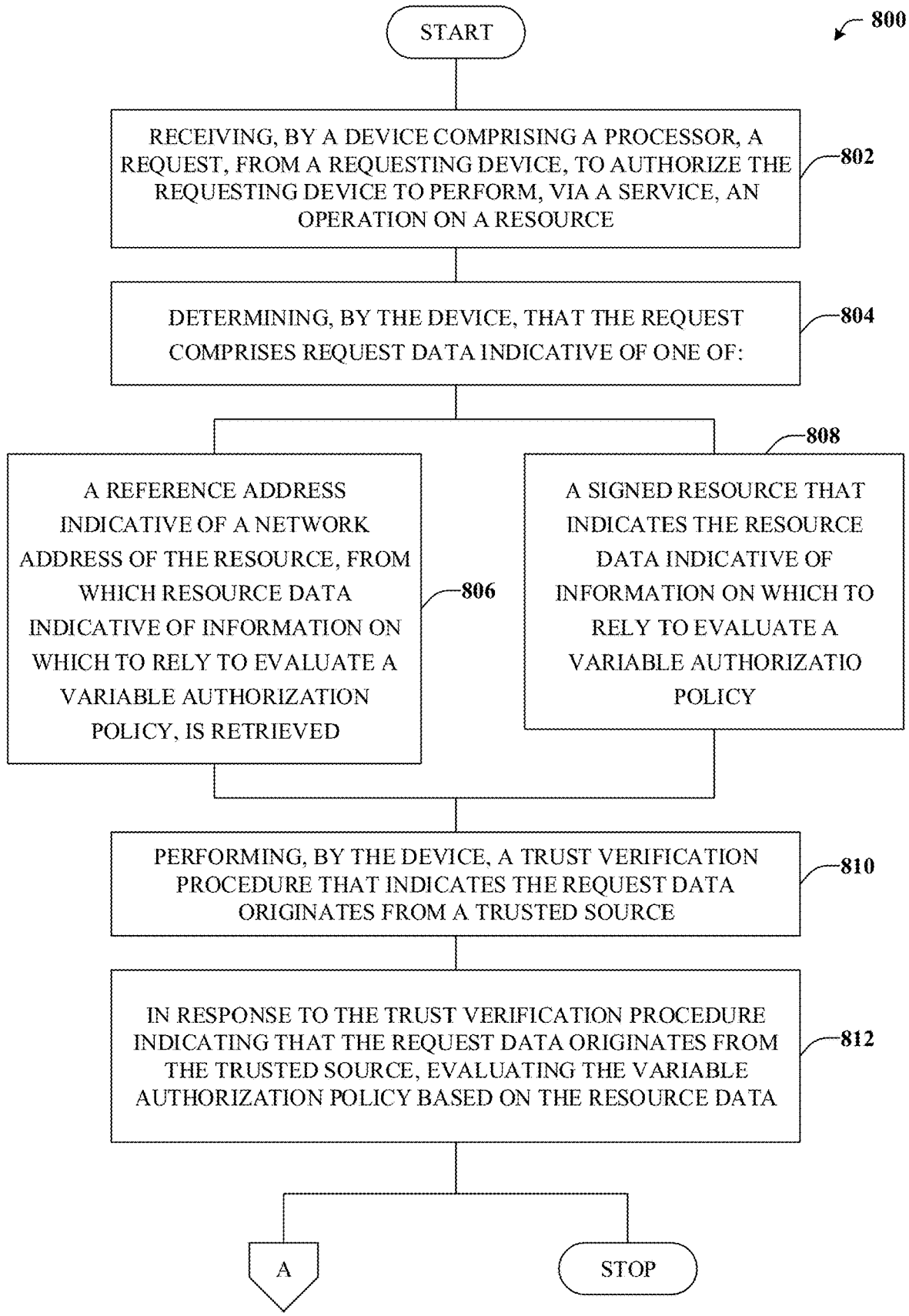
FIG. 8 illustrates an example method that can provide decentralized, zero-trust authorization according to variable fine-grained policies based on a type of AR 310 in accordance with certain embodiments of this disclosure.
Figure 9:
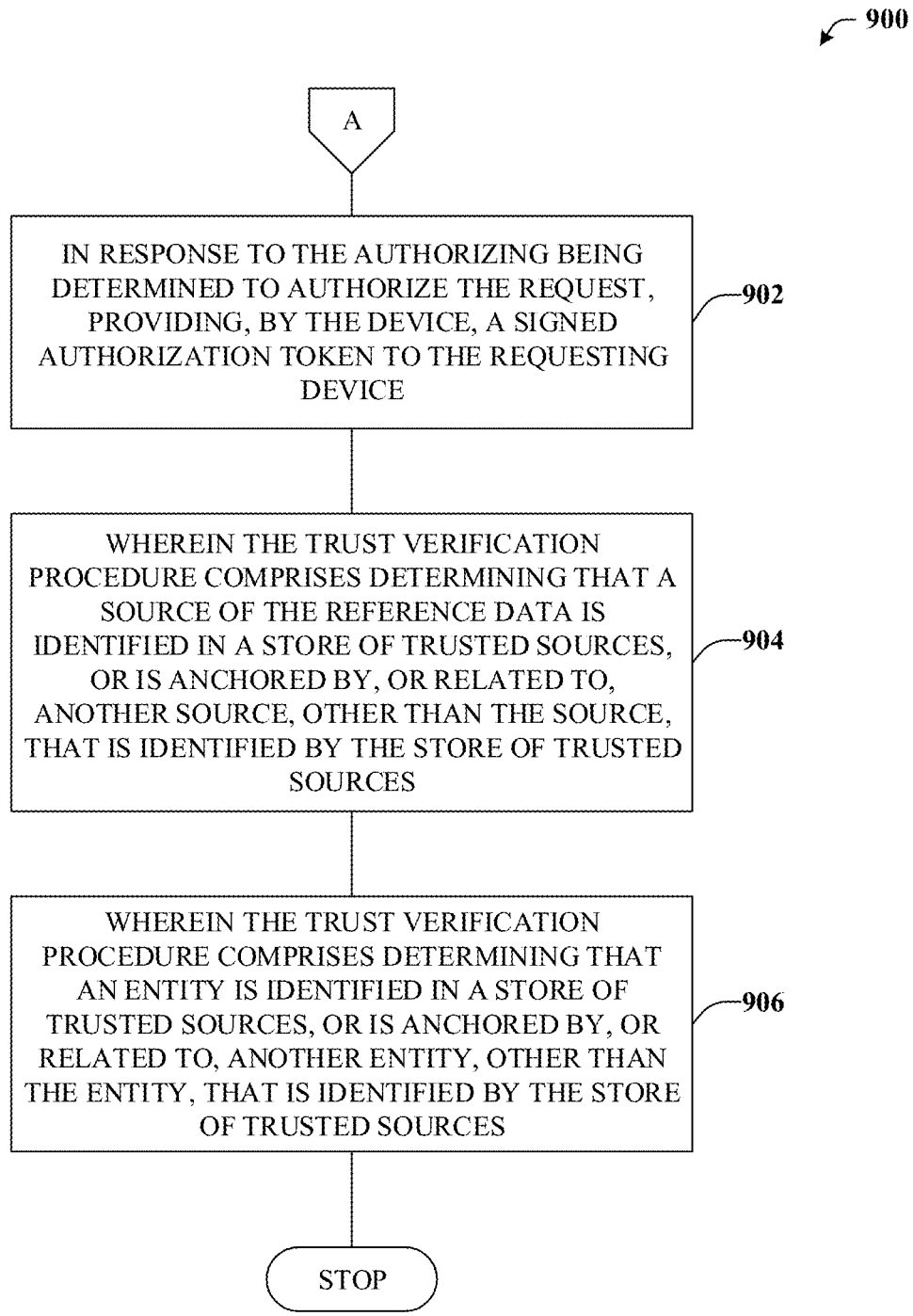
FIG. 9 illustrates an example method that can provide for additional aspect or elements in connection with decentralized, zero-trust authorization according to variable fine-grained policies based on a type of AR 310 in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can provide decentralized, zero-trust authorization according to variable fine-grained policies based on a type of AR 310 in accordance with certain embodiments of this disclosure. While method 800 describes a complete method, in some embodiments, method 800 can include one or more elements of method 900, as illustrated by insert A.

At reference numeral 802, a device comprising a processor can receive a request, from a requesting device, to authorize the requesting device to perform, via a service, an operation on a resource. Thus, the request can identify the resource and can further identify that which is being requested such as who (e.g., the requesting device), what (e.g., the operation), and where (e.g., the resource or endpoint).

At reference numeral 804, the device can determine that the request comprises request data, which can encompass multiple different types of requests. For example, if the request comprises a reference address, then such can be identified at reference numeral 806. If the request does not comprise a reference address and/or instead comprises a signed resource, then such can be identified at reference numeral 808. It is noted that the reference address can be indicative of a network address of the resource, from which resource data that is indicative of information on which to rely to evaluate a variable, authorization policy is retrieved. Additionally or alternatively, the signed resource can comprise the resource data that is indicative of information utilized to evaluate a variable, authorization policy.

At reference numeral 810, the device can perform a trust verification procedure that indicates the request data originates from a trusted source. At reference numeral 812, the device can authorize the request or deny the request. In that regard, the device can perform a policy evaluation procedure based on the resource data. Method 800 can terminate or proceed to insert A, which is further detailed in connection with FIG. 9.

Turning now to FIG. 9, exemplary method 900 is depicted. Method 900 can provide for additional aspect or elements in connection with decentralized, zero-trust authorization according to variable fine-grained policies based on a type of AR 310 in accordance with certain embodiments of this disclosure.

At reference numeral 902, the device introduced at reference numeral 802 comprising a processor can provide a signed authorization token to the requesting device.

At reference numeral 904, the device can, in accordance with the trust verification procedure of reference numeral 810, determine that a source of the reference data is identified in a store of trusted sources, or is anchored by, or related to, another source, other than the source, that is identified by the store of trusted sources.

Figure 10:
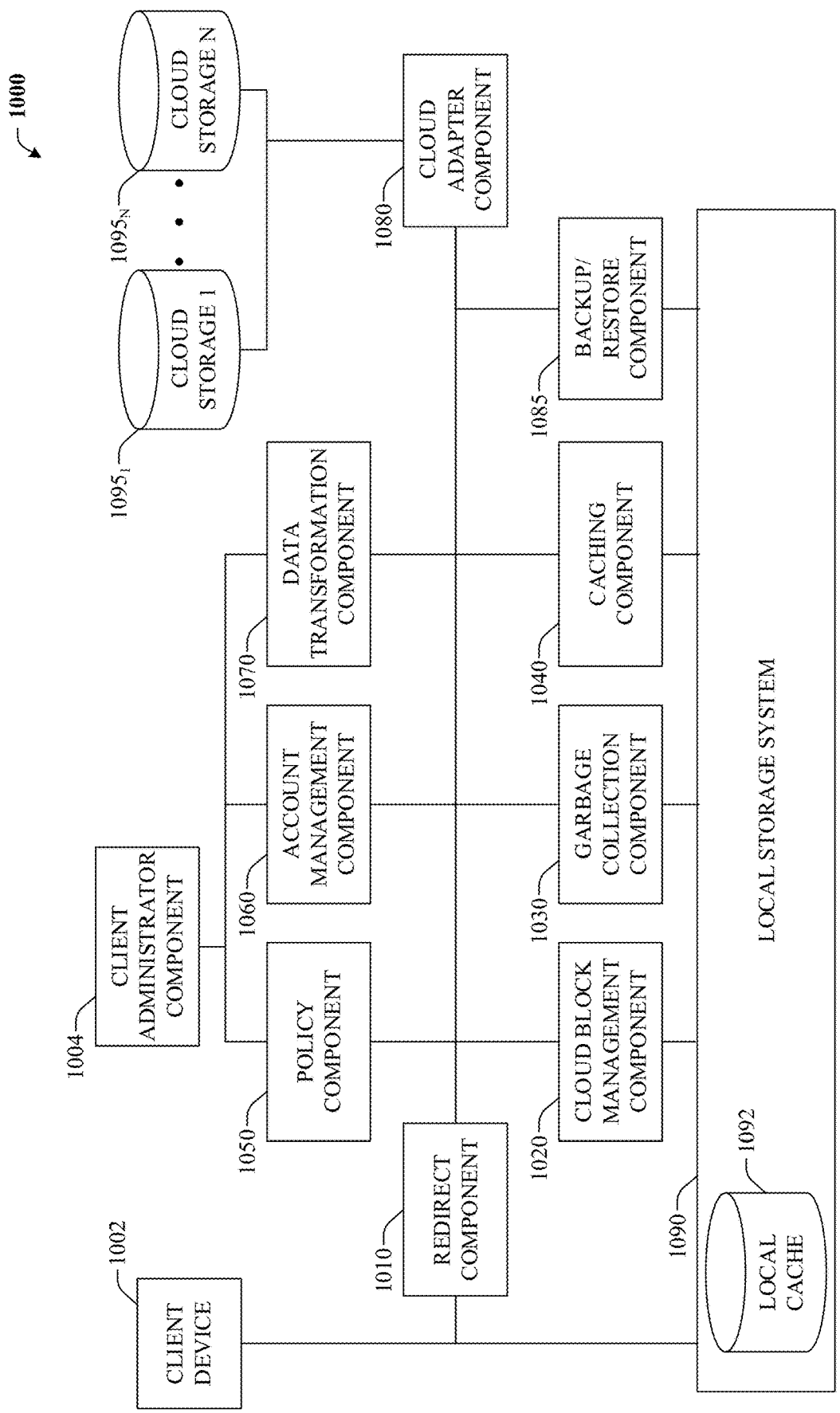
FIG. 10 illustrates a block diagram of an example distributed file storage system that employs tiered cloud storage in accordance with certain embodiments of this disclosure.
Figure 11:
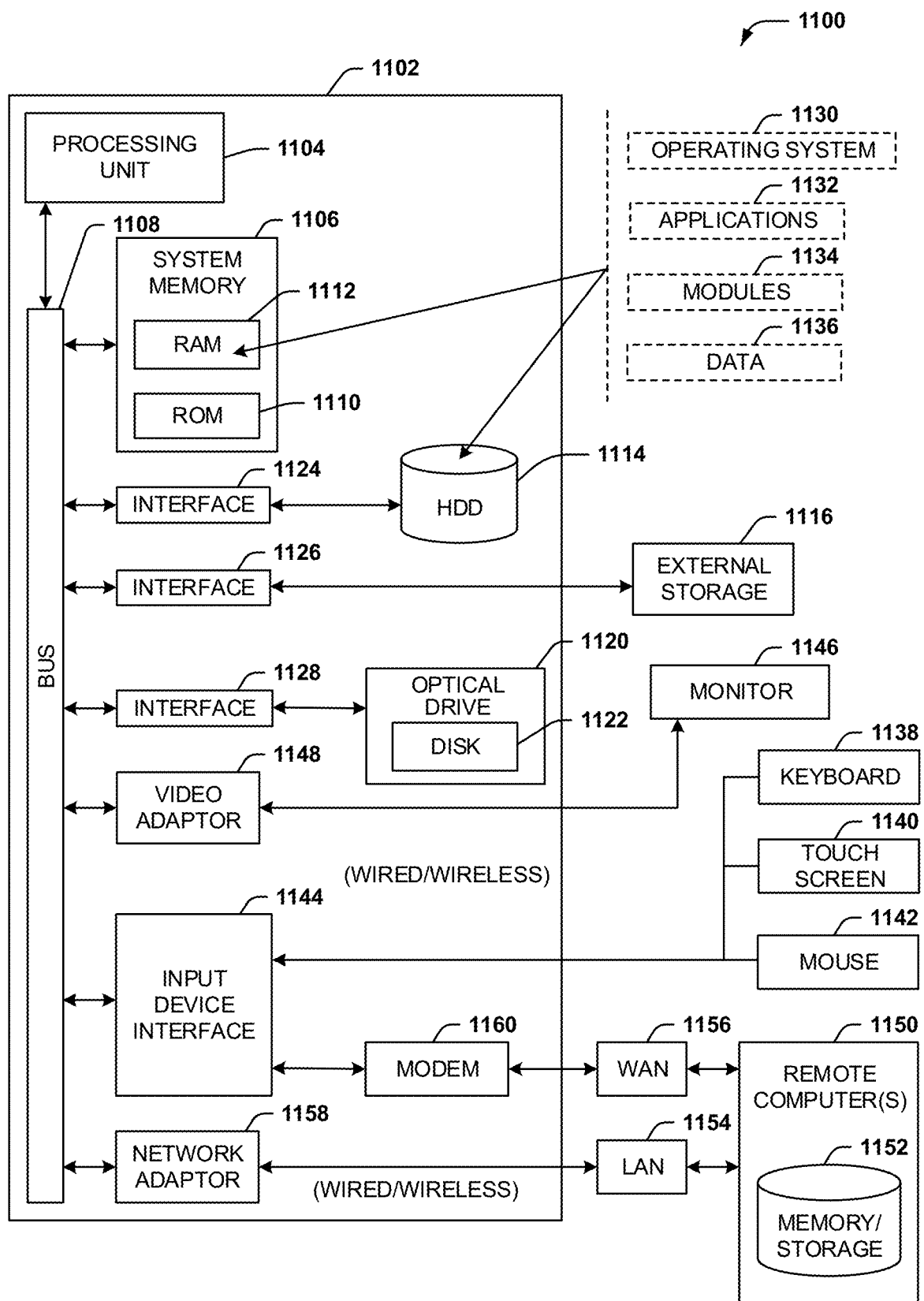
FIG. 11 illustrates an example block diagram of a computer operable to execute certain embodiments of this disclosure.

At reference numeral 906, the device can, in accordance with the trust verification procedure of reference numeral 810, determine that an entity is identified in a store of trusted sources, or is anchored by, or related to, another entity, other than the entity, that is identified by the store of trusted sources Example Operating Environments To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $1095_1$ and cloud storage N $1095_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
receiving, from a requesting device, an authorization request to authorize, based on decentralized enforcement of a variable authorization policy, the requesting device to perform, via a service, an operation on a resource;
in response to determining that the authorization request comprises a reference address indicative of a network address of the resource, retrieving resource data indicative of information relied on to evaluate the variable authorization policy;
determining that the resource data has been received from a source that is trusted; and
in response to the determining, using the resource data to evaluate the variable authorization policy.

2. The device of claim 1, further comprising or communicatively coupled to a resource inventory device that maintains a store of trusted data sources.

3. The device of claim 1, further comprising a token exchange service device configured to generate a first token in response to a second token being validated.

4. The device of claim 1, wherein the authorization request comprises identification information comprising at least one of: a requesting device identifier, a requesting application identifier, or a requesting device service identifier.

5. The device of claim 1, wherein the reference address is at least one of a uniform resource locator or a uniform resource identifier.

6. The device of claim 1, wherein the resource data comprises the resource.

7. The device of claim 1, wherein the resource data comprises a manifest of the resource.

8. The device of claim 1, wherein the source of the resource data is determined to be trusted in response to a determination that the source is identified in a store of trusted sources.

9. The device of claim 1, wherein the source of the resource data is determined to be trusted in response to a determination that the source is anchored by, or related to, another source other than the source that is identified by a store of trusted sources.

10. The device of claim 1, wherein the operations further comprise, in response to the authorizing of the authorization request being a successful authorization, communicating a signed authorization token to the requesting device.

11. An authorization server, comprising:
a processor configured to authorize an authorization request; and
a memory that stores executable instructions that, when executed by the processor, facilitate performance of operations, comprising:
receiving, from a requesting device, a request to authorize based on decentralized enforcement of a policy, the requesting device to perform, via a service, an operation on a resource;
determining that the request comprises a signed resource comprising resource data indicative of information relied on to evaluate the policy;
determining that the entity is trusted; and
in response to the determining that the entity is trusted, using the resource data to evaluate the policy.

12. The authorization server of claim 11, wherein the operations further comprise denying the authorization request in response to an unsuccessful outcome to the using the resource data to evaluate the policy.

13. The authorization server of claim 11, wherein the authorization server is configured as a token exchange service configured to generate a first token in response to a second token being validated.

14. The authorization server of claim 11, wherein the signed resource is a JavaScript object notation web token encoded as a data uniform resource identifier of a token exchange resource parameter.

15. The authorization server of claim 11, wherein the entity is determined to be trusted in response to a determination that the entity is identified by a store of trusted sources, or is anchored by, or related to, another entity other than the entity that is identified by the store of trusted sources.

16. The authorization server of claim 11, wherein the operations further comprise, in response to authorizing the request, generating a signed authorization token to be provided to the requesting device.

17. A method, comprising:
receiving, by a device comprising a processor, a request, from a requesting device, to authorize the requesting device to perform, via a service, an operation on a resource;
determining, by the device, that the request comprises request data indicative of one of:
a reference address indicative of a network address of the resource, from which resource data indicative of information on which to rely to evaluate a variable authorization policy, is retrieved, or
a signed resource that comprises the resource data indicative of the information on which to rely to evaluate the variable authorization policy;
performing, by the device, a trust verification procedure that indicates the request data originates from a trusted source; and
in response to the trust verification procedure indicating that the request data originates from the trusted source, evaluation the variable authorization policy based on the resource data.

18. The method of claim 17, further comprising, in response to the authorizing being determined to authorize the request, providing, by the device, a signed authorization token to the requesting device.

19. The method of claim 17, wherein the trust verification procedure comprises determining that a source of the request data is identified in a store of trusted sources, or is anchored by, or related to, another source, other than the source, that is identified by the store of trusted sources.

20. The method of claim 17, wherein the trust verification procedure comprises determining that an entity is identified in a store of trusted sources, or is anchored by, or related to, another entity, other than the entity, that is identified by the store of trusted sources.

* * * * *